US012798014B2

(12) United States Patent
Nakai et al.

(10) Patent No.: US 12,798,014 B2
(45) Date of Patent: Nov. 17, 2026

(54) ESTIMATION MODEL GENERATION APPARATUS AND PROCESSING STATE ESTIMATION DEVICE

(71) Applicant: Panasonic Intellectual Property Management Co., Ltd., Osaka (JP)

(72) Inventors: Izuru Nakai, Osaka (JP); Kazuki Fujiwara, Osaka (JP); Koji Funami, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 480 days.

(21) Appl. No.: 18/236,167

(22) Filed: Aug. 21, 2023

(65) Prior Publication Data

US 2023/0390871 A1 Dec. 7, 2023

Related U.S. Application Data

(63) Continuation of application No. PCT/JP2022/000133, filed on Jan. 5, 2022.

(30) Foreign Application Priority Data

Feb. 25, 2021 (JP) ................................ 2021-028761

(51) Int. Cl.
*B23K 31/00* (2006.01)
*B23K 26/00* (2014.01)

(52) U.S. Cl.
CPC .............. *B23K 31/00* (2013.01); *B23K 26/00* (2013.01)

(58) Field of Classification Search
None
See application file for complete search history.

(56) References Cited

U.S. PATENT DOCUMENTS

| | | | | |
|---|---|---|---|---|
| 2018/0307203 | A1 | 10/2018 | Aizawa et al. | |
| 2020/0331096 | A1 * | 10/2020 | Watanabe ............ | B23K 26/042 |
| 2021/0354234 | A1 | 11/2021 | Tanaka et al. | |

FOREIGN PATENT DOCUMENTS

| | | |
|---|---|---|
| JP | 2000-153379 | 6/2000 |
| JP | 2012-213806 | 11/2012 |
| JP | 6530779 | 5/2019 |
| JP | 2019-152469 | 9/2019 |

(Continued)

*Primary Examiner* — Matthew G Marini
(74) *Attorney, Agent, or Firm* — Wenderoth, Lind & Ponack, L.L.P.

(57) ABSTRACT

An estimation model generation device is a device that generates an estimation model for estimating a processing state of laser processing. First thermal radiation, first visible light, first reflected light, and first laser light are observed from a workpiece during laser processing by a first device, and the device includes an information acquiring section that acquires first waveform data including a first waveform and a second waveform for at least two of the first thermal radiation, the first visible light, the first reflected light, and the first laser light, an estimation model generating section that performs machine learning by using teacher data having the first waveform data as an explanatory variable and the processing state as a target variable in association with each other to generate a first estimation model for estimating the processing state by the first device, and a storage that stores the first estimation model.

5 Claims, 7 Drawing Sheets

(56) References Cited

FOREIGN PATENT DOCUMENTS

| | | | | |
|---|---|---|---|---|
| JP | 2020-189305 | | 11/2020 | |
| WO | WO-2014155191 | A2 * | 10/2014 | ........... G01N 33/205 |
| WO | 2020/152757 | | 7/2020 | |

* cited by examiner

ESTIMATION MODEL GENERATION APPARATUS AND PROCESSING STATE ESTIMATION DEVICE

TECHNICAL FIELD

The present disclosure relates to an estimation model generation method of a laser processing state by laser and a processing state estimation device.

BACKGROUND ART

There is known a method for detecting visible light, reflected light, thermal radiation, or the like emitted from a workpiece during laser processing when a processing state is determined by laser processing.

For example, a welding state determination device described in PTL 1 detects intensities of plasma light and reflected light emitted from a workpiece during laser welding, and determines a state of the workpiece by using an extreme value of a feature value extracted based on an intensity of detection light in a predetermined section.

CITATION LIST

Patent Literature

PTL 1: Unexamined Japanese Patent Publication No. 2000-153379

SUMMARY OF THE INVENTION

An estimation model generation device according to one aspect of the present disclosure is a device that generates an estimation model for estimating a processing state of laser processing. First thermal radiation, first visible light, first reflected light, and first laser light are observed from a workpiece during laser processing by a first device, and the device includes an information acquiring section that acquires first waveform data including a first waveform and a second waveform for at least two of the first thermal radiation, the first visible light, the first reflected light, and the first laser light, an estimation model generating section that performs machine learning by using teacher data having the first waveform data as an explanatory variable and the processing state as a target variable in association with each other to generate a first estimation model for estimating the processing state by the first device, and a storage that stores the first estimation model.

An estimation model generation device according to another aspect of the present disclosure is a device that generates an estimation model for estimating a processing state of laser processing in a first device and a second device. Third thermal radiation, third visible light, third reflected light, and third laser light are observed from a workpiece during laser processing by the first device, and fourth thermal radiation, fourth visible light, fourth reflected light, and fourth laser light are observed from the workpiece during laser processing by the second device, and the device includes an information acquiring section that acquires third waveform data including a fifth waveform and a sixth waveform for at least two of the third thermal radiation, the third visible light, the third reflected light, and the third laser light and fourth waveform data including a seventh waveform and an eighth waveform for at least two of the fourth thermal radiation, the fourth visible light, the fourth reflected light, and the fourth laser light, an information converting section that generates second conversion data by multiplying the fifth waveform by a third coefficient calculated by a relationship between the fifth waveform and the seventh waveform and multiplying the sixth waveform by a fourth coefficient calculated by a relationship between the sixth waveform and the eighth waveform, an estimation model generating section that generates a second estimation model for estimating the processing state by the first device and a third estimation model for estimating the processing state by the second device, and a storage that stores the second estimation model and the third estimation model. The estimation model generation unit generates the second estimation model by performing machine learning by using teacher data having the third waveform data as an explanatory variable and the processing state as a target variable in association with each other, and generates the third estimation model by performing machine learning by using teacher data having the second waveform data as an explanatory variable and the processing state as a target variable in association with each other.

Figure 1A:
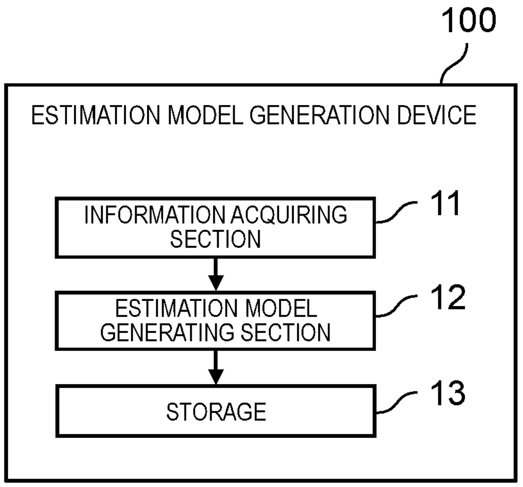
FIG. 1A is a block diagram illustrating an estimation model generation device according to a first exemplary embodiment.

DESCRIPTION OF EMBODIMENT (Underlying Knowledge Forming Basis of Present Disclosure)

In a case where a processing state during laser processing is monitored, a sensor may detect thermal radiation, reflected light, visible light, and laser light emitted from a laser processing unit as in the welding state determination device described in PTL 1.

For example, there is also known a method for generating an estimation model by performing machine learning by using such sensing data as an explanatory variable and teacher data having a processing state as a target variable, and determining a processing state from sensing data during processing by using the estimation model.

Since laser processing is non-contact processing, reproducibility of a processing phenomenon is high. In other words, in a similar processing state, intensities of the thermal radiation, the reflected light, the visible light, the laser light, and the like are substantially the same. However, due to variations in light transmission efficiency, amplifier gain, or the like, a machine difference is generated in the sensing data acquired by the sensor for each processing device. Thus, there is a problem that it is difficult to accurately estimate a processing state when an estimation model generated by using sensing data in a predetermined processing device is used in another processing device. In other words, in the welding state determination device described in PTL 1, there is a problem that light rays of different intensities are detected even in a similar processing state due to the machine difference of the sensor that detects the intensity of the light.

In addition, in a device used in a production line, it is difficult to adopt a method for changing a parameter for learning, that is, acquiring sensing data under a condition other than a standard processing condition. Thus, for example, sensing data for learning may be acquired by using an experimental device or the like, and an estimation model may be created. The estimation model created in this manner is difficult to use for estimating the processing state of the device used in the production line for the reason described above.

Thus, the inventors of the present invention have studied a method in which the estimation model generated by using the sensing data in the predetermined processing device can also be used in another processing device, and have reached the following invention. The present disclosure provides an estimation model generation device and a processing state estimation device capable of using an estimation model generated by a predetermined processing device also in another processing device.

An estimation model generation device according to one aspect of the present disclosure is a device that generates an estimation model for estimating a processing state of laser processing. First thermal radiation, first visible light, first reflected light, and first laser light are observed from a workpiece during laser processing by a first device, and the device includes an information acquiring section that acquires first waveform data including a first waveform and a second waveform for at least two of the first thermal radiation, the first visible light, the first reflected light, and the first laser light, an estimation model generating section that performs machine learning by using teacher data having the first waveform data as an explanatory variable and the processing state as a target variable in association with each other to generate a first estimation model for estimating the processing state by the first device, and a storage that stores the first estimation model.

A processing state estimation device according to one aspect of the present disclosure is a device that estimates a processing state of laser processing in a second device different from the first device described above. Second thermal radiation, second visible light, second reflected light, and second laser light are observed from a workpiece during laser processing by the second device, and the device includes an information acquiring section that acquires second waveform data including a third waveform and a fourth waveform for at least two of the second thermal radiation, the second visible light, the second reflected light, and the second laser light, an information converting section that generates first conversion data by multiplying the third waveform by a first coefficient calculated by a relationship between the third waveform and the first waveform and multiplying the fourth waveform by a second coefficient calculated by a relationship between the fourth waveform and the second waveform, a storage that stores the first estimation model generated by the estimation model generation device described above, and an estimating section that estimates the processing state from the first conversion data based on the first estimation model.

According to this configuration, it is possible to provide the estimation model generation device and the processing state estimation device capable of using the estimation model generated by the predetermined processing device also in another processing device. The estimation model generation device generates the first estimation model by using the first waveform data in the first device. The waveform data in the second device is multiplied by a predetermined coefficient, and thus, the same first estimation model can be used in different devices by converting the waveform data in the second device to match the waveform data of the first device.

When the first coefficient and the second coefficient are determined, the first conversion data may be generated while a ratio between average values of the first waveform and the second waveform is maintained.

According to such a configuration, it is possible to provide the estimation model generation device and the processing state estimation device with higher estimation accuracy.

An estimation model generation device according to another aspect of the present disclosure is a device that generates an estimation model for estimating a processing state of laser processing in a first device and a second device. Third thermal radiation, third visible light, third reflected light, and third laser light are observed from a workpiece during laser processing by the first device, and fourth thermal radiation, fourth visible light, fourth reflected light, and fourth laser light are observed from the workpiece during laser processing by the second device, and the device includes an information acquiring section that acquires third waveform data including a fifth waveform and a sixth waveform for at least two of the third thermal radiation, the third visible light, the third reflected light, and the third laser light and fourth waveform data including a seventh waveform and an eighth waveform for at least two of the fourth thermal radiation, the fourth visible light, the fourth reflected light, and the fourth laser light, an information converting section that generates second conversion data by multiplying the fifth waveform by a third coefficient calculated by a relationship between the fifth waveform and the seventh waveform and multiplying the sixth waveform by a fourth coefficient calculated by a relationship between the sixth waveform and the eighth waveform, an estimation model generating section that generates a second estimation model for estimating the processing state by the first device and a third estimation model for estimating the processing state by the second device, and a storage that stores the second estimation model and the third estimation model. The estimation model generation unit generates the second estimation model by performing machine learning by using teacher data having the third waveform data as an explanatory variable and the processing state as a target variable in association with each other, and generates the third estimation model by performing machine learning by using teacher data having the second waveform data as an explanatory variable and the processing state as a target variable in association with each other.

According to this configuration, the waveform data in the first device is converted to match the second device, and thus, the third estimation model for the second device can be generated while the waveform data of the first device is used.

When the third coefficient and the fourth coefficient are determined, the second conversion data may be generated while a ratio between average values of the seventh waveform and the eighth waveform is maintained.

According to this configuration, it is possible to provide the estimation model generation device and the processing state estimation device with higher estimation accuracy.

A processing state estimation device according to still another aspect of the present disclosure is a device that estimates a processing state of laser processing. The device includes a storage that stores a third estimation model generated by the estimation model generation device described above, an information acquiring section that acquires the fourth waveform data, and an estimating section that estimates the processing state from the fourth waveform data based on the third estimation model.

According to this configuration, the estimation model can be generated for each machining device.

The exemplary embodiment of the present disclosure will now be described herein in detail with reference to the drawings appropriately. Unnecessary detailed description may be omitted. For example, detailed description of well-known matters and repeated description of substantially the same configuration may be omitted. This is to avoid an unnecessarily redundant description below and to facilitate understanding of a person skilled in the art. Here, the inventors of the present invention provide the accompanying drawings and the following description such that those skilled in the art can sufficiently understand the present disclosure, and therefore, does not intend to restrict the subject matters of claims by the accompanying drawings and the following description.

First Exemplary Embodiment

[Overall Configuration]

Figure 1B:
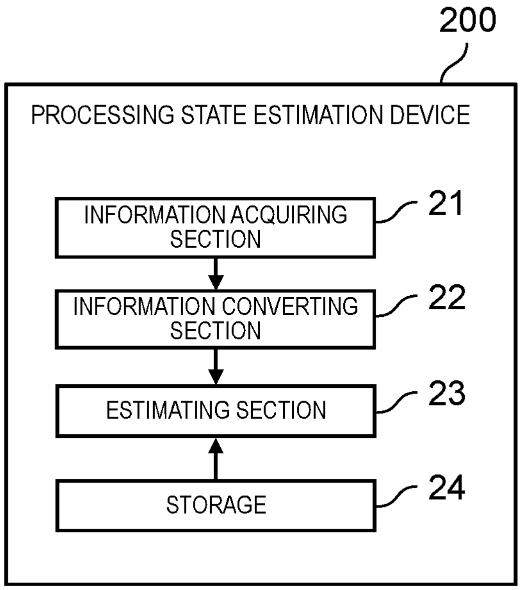
FIG. 1B is a block diagram illustrating a processing state estimation device according to the first exemplary embodiment.
Figure 1C:
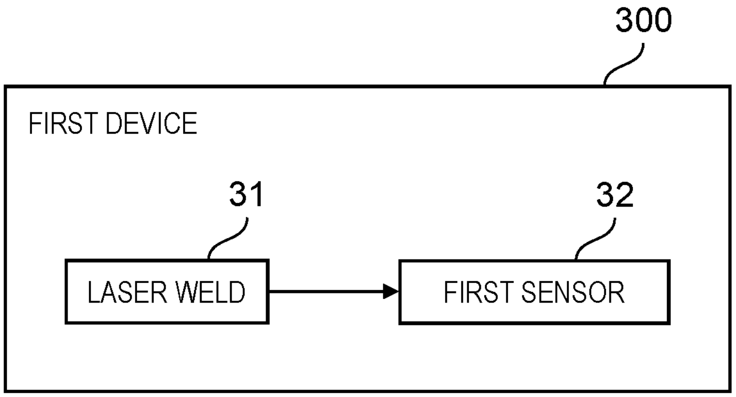
FIG. 1C is a block diagram illustrating a first device.
Figure 1D:
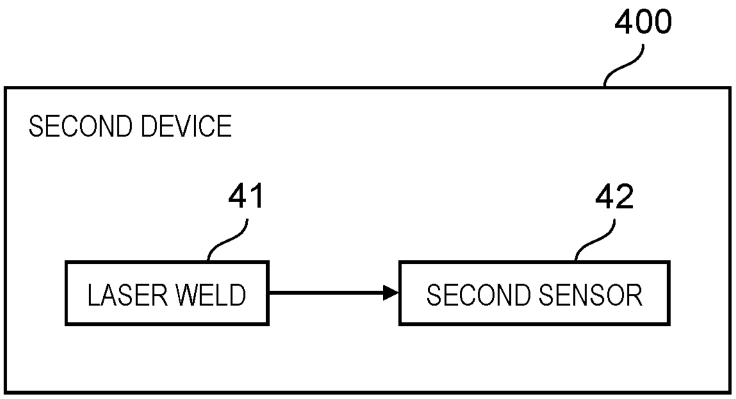
FIG. 1D is a block diagram illustrating a second device.

FIG. 1A is a block diagram illustrating estimation model generation device 100 according to a first exemplary embodiment. FIG. 1B is a block diagram illustrating processing state estimation device 200 according to the first exemplary embodiment. FIG. 1C is a block diagram illustrating first device 300. FIG. 1D is a block diagram illustrating second device 400. Each device may be installed in an identical factory or in two or more sites. Estimation model generation device 100 and processing state estimation device 200 may be integrated.

Estimation model generation device 100 and processing state estimation device 200 according to the present exemplary embodiment will be described with reference to FIGS. 1A to 1D. Estimation model generation device 100, processing state estimation device 200, and devices 300 and 400 are connected to be able to communicate with each other in a wired or wireless manner. The communication can be performed by using a public line such as the Internet and/or a dedicated line.

Estimation model generation device 100 illustrated in FIG. 1A is a device that generates a first estimation model for estimating a processing state by using sensing data in first device 300 illustrated in FIG. 1C. Estimation model generation device 100 can be constructed by using, for example, a computer system such as a PC or a workstation. Estimation model generation device 100 includes information acquiring section 11, estimation model generating section 12, and storage 13. An internal configuration of estimation model generation device 100 will be described later.

Processing state estimation device 200 illustrated in FIG. 1B is a device that estimates a processing state in first device 300 or second device 400 different from first device 300 based on the first estimation model generated by estimation model generation device 100 in FIG. 1A. Processing state estimation device 200 may be configured with, for example, a microcomputer, a central processing unit (CPU), a microprocessor unit (MPU), a graphics processor unit (GPU), a digital signal processor (DSP), a field-programmable gate array (FPGA), or an application specific integrated circuit (ASIC). A function of processing state estimation device 200 may be configured only with hardware or may be implemented by a combination of hardware and software. Processing state estimation device 200 includes information acquiring section 21, information converting section 22, estimating section 23, and storage 24. An internal configuration of processing state estimation device 200 will be described later.

First device 300 and second device 400 illustrated in FIGS. 1C and 1D are laser processing devices that perform welding or cutting with laser light. A metal plate to be processed is irradiated with laser light, and thus, the metal plate can be welded or cut. First device 300 includes laser weld 31 and first sensor 32. Second device 400 includes laser weld 41 and second sensor 42.

First device 300 is a laser processing device for which the first estimation model is generated, such as an experimental device. Second device 400 is, for example, a device used in a production line.

In first device 300 and second device 400, thermal radiation, visible light, and reflected light are generated when a workpiece is irradiated with laser light. Thermal radiation, visible light, and reflected light generated during laser processing in first device 300 are detected as first thermal radiation, first visible light, and first reflected light by first sensor 32. Further, in first device 300, first sensor 32 detects laser light emitted during processing as the first laser light. Similarly, during laser processing in second device 400, second thermal radiation, second visible light, second reflected light, and second laser light are detected by second sensor 42. First sensor 32 and second sensor 42 are, for example, photo detectors. Note that first sensor 32 and second sensor 42 may include different sensors for thermal radiation, visible light, reflected light, and laser light.

The thermal radiation is generated as a temperature of a portion irradiated with the laser light rises when the workpiece is irradiated with the laser light. The visible light is plasma light generated by irradiating the workpiece with the laser light such that a melted workpiece absorbs the laser light. The reflected light is light obtained by reflecting laser light applied to the workpiece.

<Estimation Model Generation Device>

Estimation model generation device 100 is a device that generates the first estimation model for estimating the processing state of the laser processing in first device 300. As described above, estimation model generation device 100 includes information acquiring section 11, estimation model generating section 12, and storage 13.

Information acquiring section 11 acquires first waveform data including a first waveform and a second waveform for at least two of the first heat radiation, the first visible light, the first reflected light, and the first laser light from the workpiece detected during the laser processing in first device 300. The first waveform data is acquired based on a detection value detected by sensor 32 of first device 300.

Figure 2A:
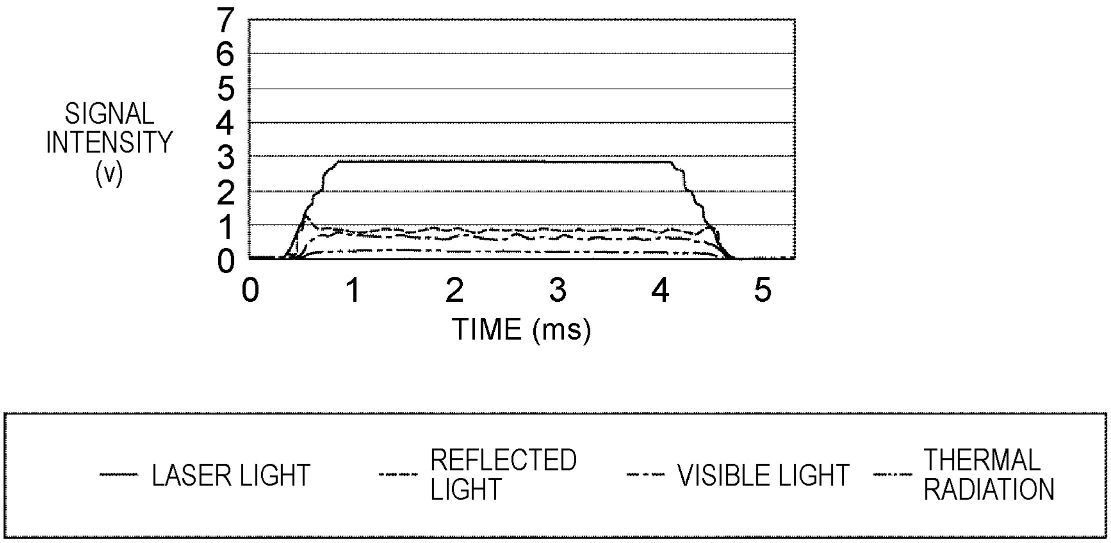
FIG. 2A is a graph showing first waveform data acquired by an information acquiring section.

FIG. 2A is a graph showing the first waveform data acquired by information acquiring section 11. As illustrated in FIG. 2A, the first waveform data is data including waveforms of the first thermal radiation, the first visible light, the first reflected light, and the first laser light during the laser processing. In the example of FIG. 2A, the first waveform data includes four waveforms of the thermal radiation, the visible light, the reflected light, and the laser light. For example, among these four waveforms, the waveform of the laser light can be set to the first waveform, and the waveform of the visible light can be set to the second waveform. The first waveform data includes at least two waveforms of the first waveform and the second waveform. Note that the first waveform and the second waveform are not limited to the waveform of the laser light and the waveform of the visible light, and may be any waveforms that can be detected by sensor 32.

The number of waveforms included in the first waveform data may be at least two. Since the waveform of the laser light is obtained by detecting the laser light output from laser weld 31 by sensor 32, the output is relatively stable. Accordingly, the first waveform data preferably includes the waveform of the first laser light. In addition, the number of waveforms included is not limited to two, and may be three or more.

Two or more waveforms are included in the first waveform data, and thus, it is possible to generate an estimation model with higher estimation accuracy.

Estimation model generating section 12 performs machine learning by using teacher data having the first waveform data as an explanatory variable and the processing state as a target variable, and generates the first estimation model for estimating the processing state in first device 300. The processing state indicates, for example, a state during processing, such as a shift of a focal position of the laser light, a shift of an irradiation position of the laser light, or presence or absence of a hole.

In first device 300, laser processing is performed under standard processing conditions used in a production line and processing conditions other than the standard processing conditions, and information acquiring section 11 can acquire the first waveform data based on each piece of sensing data. As described above, the first estimation model with higher estimation accuracy can be generated by acquiring pieces of data of various processing conditions.

storage 13 stores the first estimation model.

<Processing State Estimation Device>

Processing state estimation device 200 is a device that estimates the processing state of the laser processing in second device 400. As described above, processing state estimation device 200 includes information acquiring section 21, information converting section 22, estimating section 23, and storage 24.

Information acquiring section 21 acquires second waveform data including a third waveform and a fourth waveform for at least two of the second heat radiation, the second visible light, the second reflected light, and the second laser light detected during the laser processing in the second device.

Figure 2B:
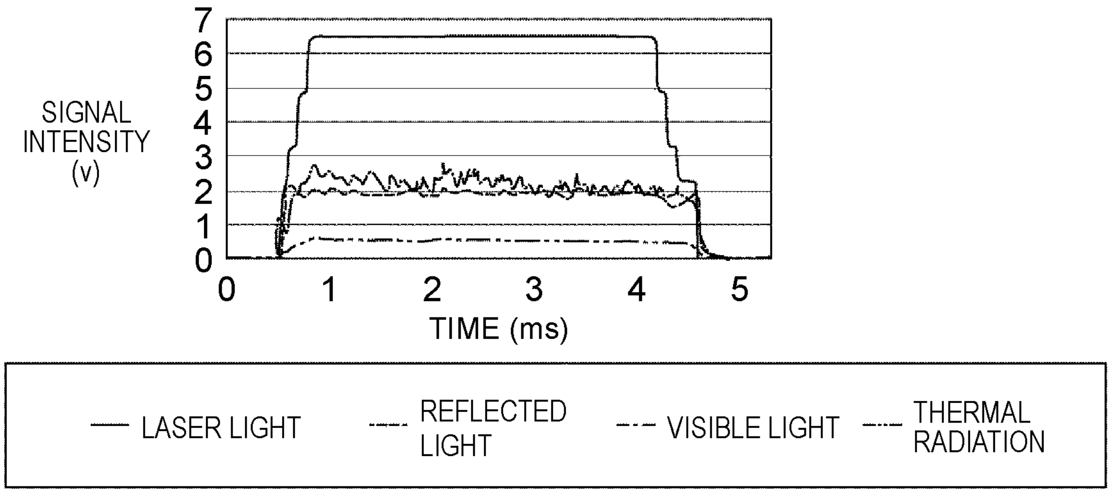
FIG. 2B is a graph showing second waveform data acquired by the information acquiring section.

The second waveform data includes the same type of waveforms as included in the first waveform data. FIG. 2B is a graph showing the second waveform data acquired by information acquiring section 21. The second waveform data includes the same waveform data as the first waveform data illustrated in FIG. 2A, that is, four waveforms of the thermal radiation, the visible light, the reflected light, and the laser light. For example, among these four waveforms, the waveform of the laser light is the third waveform, and the waveform of the visible light is the fourth waveform. That is, the first waveform of the first waveform data and the third waveform of the second waveform data indicate the same laser light, and the second waveform of the first waveform data and the fourth waveform of the second waveform data indicate the same visible light.

In general, since the laser processing is non-contact processing, reproducibility is high. Thus, under the same processing condition, tendencies of the waveforms of the thermal radiation, the visible light, the reflected light, and the laser light described above are similar between first device 300 and second device 400. However, as illustrated in FIGS. 2A and 2B, detection values of the thermal radiation, the visible light, the reflected light, and the laser light described above in first device 300 and second device 400 are different from each other due to variations in light transmission efficiency, amplifier gain, or the like.

Accordingly, in a case where the processing state is estimated from processing data acquired during the processing in second device 400 based on the first estimation model generated by performing machine learning by using the first waveform data, a correct estimation result may not be obtained.

Thus, in the present exemplary embodiment, processing state estimation device 200 generates first conversion data obtained by converting the second waveform data acquired based on the detection value from second device 400 to match the first waveform data by a predetermined coefficient. The first conversion data is data converted to match the first waveform data based on the detection value in first device 300.

The second waveform data is converted into the first conversion data, and thus, it is possible to estimate the processing state based on the first estimation model for the laser processing in second device 400.

Information converting section 22 generates the first conversion data by multiplying each waveform of the second waveform data based on the detection value in second device 400 by a predetermined coefficient. The predetermined coefficient is calculated by a relationship between the same type of waveforms. Specifically, the first coefficient is calculated from a relationship between the third waveform (second laser light) and the first waveform (first laser light). In addition, a second coefficient is calculated from a relationship between the fourth waveform (second visible light) and the second waveform (first visible light). In a case where the first waveform data and the second waveform data include three or more waveforms, coefficients are calculated for the same type of waveforms, and the waveform included in the second waveform data is multiplied by the calculated coefficient.

Figure 3A:
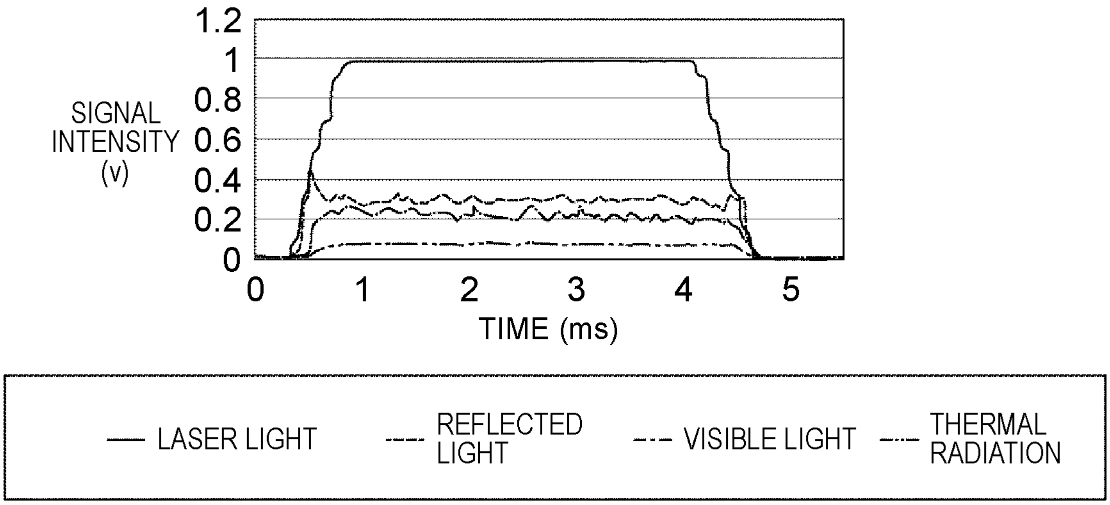
FIG. 3A is a graph obtained by normalizing the first waveform data.
Figure 3B:
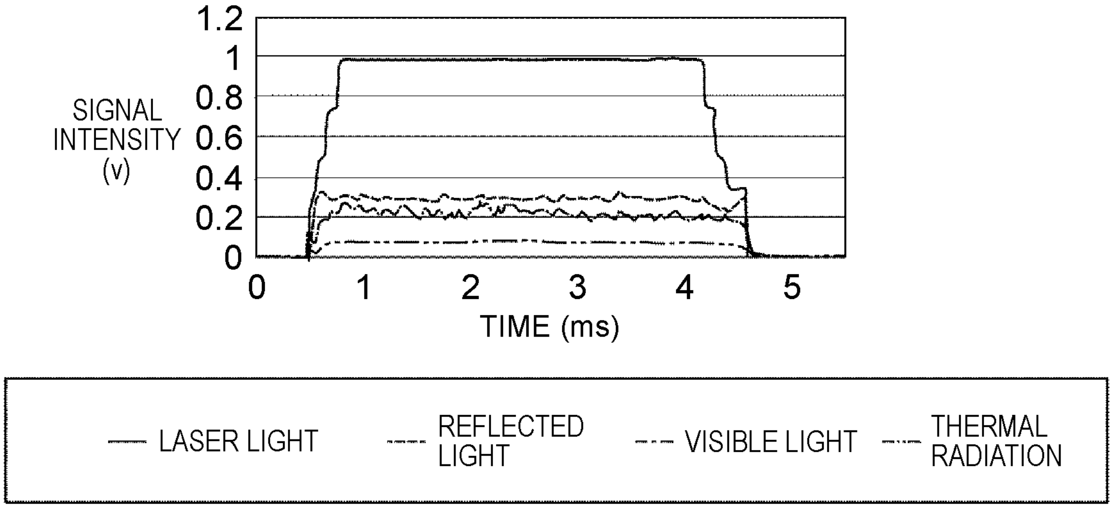
FIG. 3B is a graph obtained by normalizing first conversion data.

FIG. 3A is a graph obtained by normalizing the first waveform data. FIG. 3B is a graph obtained by normalizing the first conversion data. Note that the first waveform data illustrated in FIG. 3A is obtained by normalizing the graph of FIG. 2A such that an intensity of the laser light becomes 1 V. That is, the graph of FIG. 3A is a graph obtained by multiplying signal intensity of each waveform of the graph of FIG. 2A by 0.34 and normalizing the signal intensity.

Similarly, the first conversion data illustrated in FIG. 3B is obtained by multiplying the graph of FIG. 2B by a coefficient and then normalizing the graph such that the intensity of the laser light becomes 1 V. That is, the graph of FIG. 3B is a graph obtained by multiplying the intensity of the laser light in the graph of FIG. 2A by 0.15 (first coefficient), the intensity of the reflected light by 0.15, the intensity of the visible light by 0.10 (second coefficient), and the intensity of the thermal radiation by 0.13. Each coefficient can be calculated from, for example, an average value of signal intensities between 1 ms to 4 ms of each waveform of the first waveform data and an average value of signal intensities between 1 ms to 4 ms of each waveform of the second waveform data.

That is, the first coefficient is calculated such that an average value of signal intensities between 1 ms to 4 ms of the second laser light (third waveform) of the second waveform data is converted into an average value of signal intensities between 1 ms to 4 ms of the first laser light (first waveform) of the first waveform data. For example, the first coefficient is a ratio of the average value of the signal intensities of the first laser light (first waveform) to the average value of the signal intensities of the second laser light (third waveform). Similarly, the second coefficient is calculated such that an average value of signal intensities of the second visible light (fourth waveform) of the second waveform data is converted into an average value of signal intensities of the first visible light (second waveform) of the first waveform data. For example, the second coefficient is a ratio of the average value of the signal intensities of the first visible light (second waveform) to the signal intensities of the second visible light (fourth waveform). The first coefficient and the second coefficient are calculated in this manner, and thus, the second waveform data can be converted into the first conversion data while the ratio between the average values of the signal intensities of the waveforms in the first waveform data is maintained.

Note that, in the first waveform data and the first conversion data, the normalization of data may not be performed, and the first conversion data may be generated by multiplying each waveform of the second waveform data by the predetermined coefficient.

As illustrated in FIGS. 3A and 3B, each waveform of the second waveform data is multiplied by the predetermined coefficient to obtain the first conversion data, and thus, it is possible to obtain the waveform representing the tendency similar to the tendency of the first waveform data.

Storage 24 stores the first estimation model generated by estimation model generation device 100.

Estimating section 23 estimates the processing state from the first conversion data based on the first estimation model. When the first conversion data is input, estimating section 23 estimates the processing state based on the first estimation model and outputs an estimation result. In the first conversion data, the ratio between the average values of the waveforms of the first waveform data is maintained. Thus, when the first conversion data is used as an input to estimating section 23, the processing state can be accurately estimated by using the first estimation model.

<Verification>

Figure 4A:
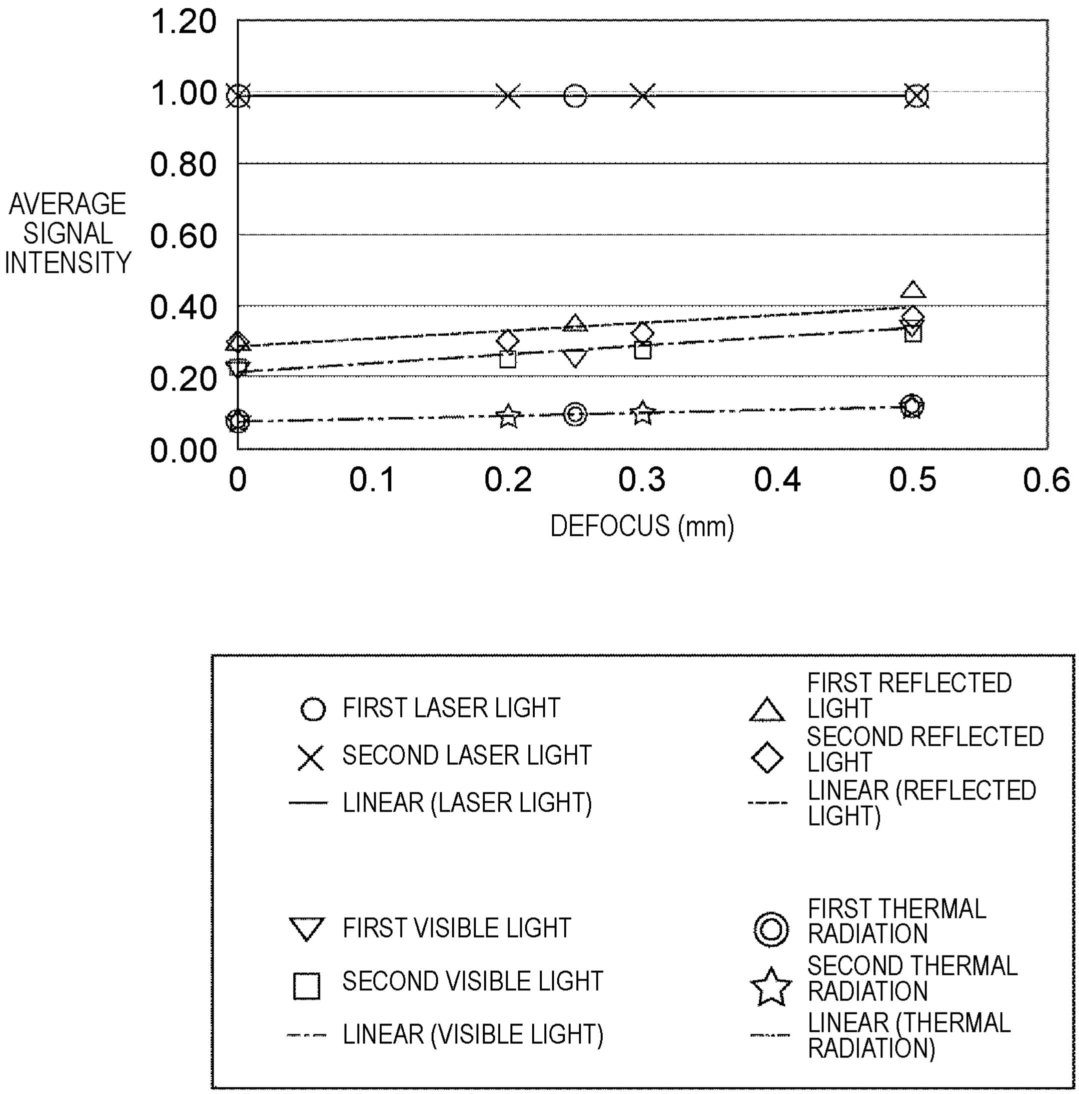
FIG. 4A is a graph showing a relationship between an average signal intensity and a defocus amount in the first waveform data and the first conversion data.

FIG. 4A is a graph showing a relationship between an average signal intensity and a defocus amount in the first waveform data and the first conversion data. A change in average signal intensity between the first waveform data and the first conversion data when the defocus amount is changed was verified.

In the verification, a position where the focal position of the laser light is in the vicinity of a surface of the workpiece is defined as defocus 0 mm and the first waveform data and the first conversion data when the focal position of the laser light is separated from the surface of the workpiece were acquired. In FIG. 4A, the average signal intensity indicates an average value of the signal intensities, for example, between 1 ms to 4 ms in the normalized first waveform data as illustrated in FIG. 3A and the normalized first conversion data as illustrated in FIG. 3B.

In the graph of FIG. 4A, the first laser light, the first reflected light, the first visible light, and the first thermal radiation indicate the average signal intensity of the first waveform data based on the detection value in first device 300. Note that the first waveform data is normalized such that the average signal intensity of the first laser light becomes 1 V. In addition, the second laser light, the second reflected light, the second visible light, and the second thermal radiation indicate the average signal intensity of the first conversion data generated by multiplying the second waveform data based on the detection value in second device 400 by each predetermined coefficient. Similarly, the first conversion data is normalized such that the average signal intensity of the second laser light becomes 1 V.

As shown in the graph of FIG. 4A, it can be seen that the change in the average signal intensity when the defocus amount is increased indicates substantially similar transition between the first waveform data and the first conversion data. Accordingly, the processing state estimated from the first waveform data based on the first estimation model and the processing state estimated from the first conversion data based on the first estimation model have substantially similar results.

In the present exemplary embodiment, information converting section 22 of processing state estimation device 200 converts the first conversion data obtained by converting the second waveform data based on the detection value in second device 400. Estimating section 23 can estimate the processing state based on the first estimation model by using the first conversion data as an input. That is, the first estimation model generated by using the first waveform data based on the detection value in first device 300 can be used in second device 400.

Figure 4B:
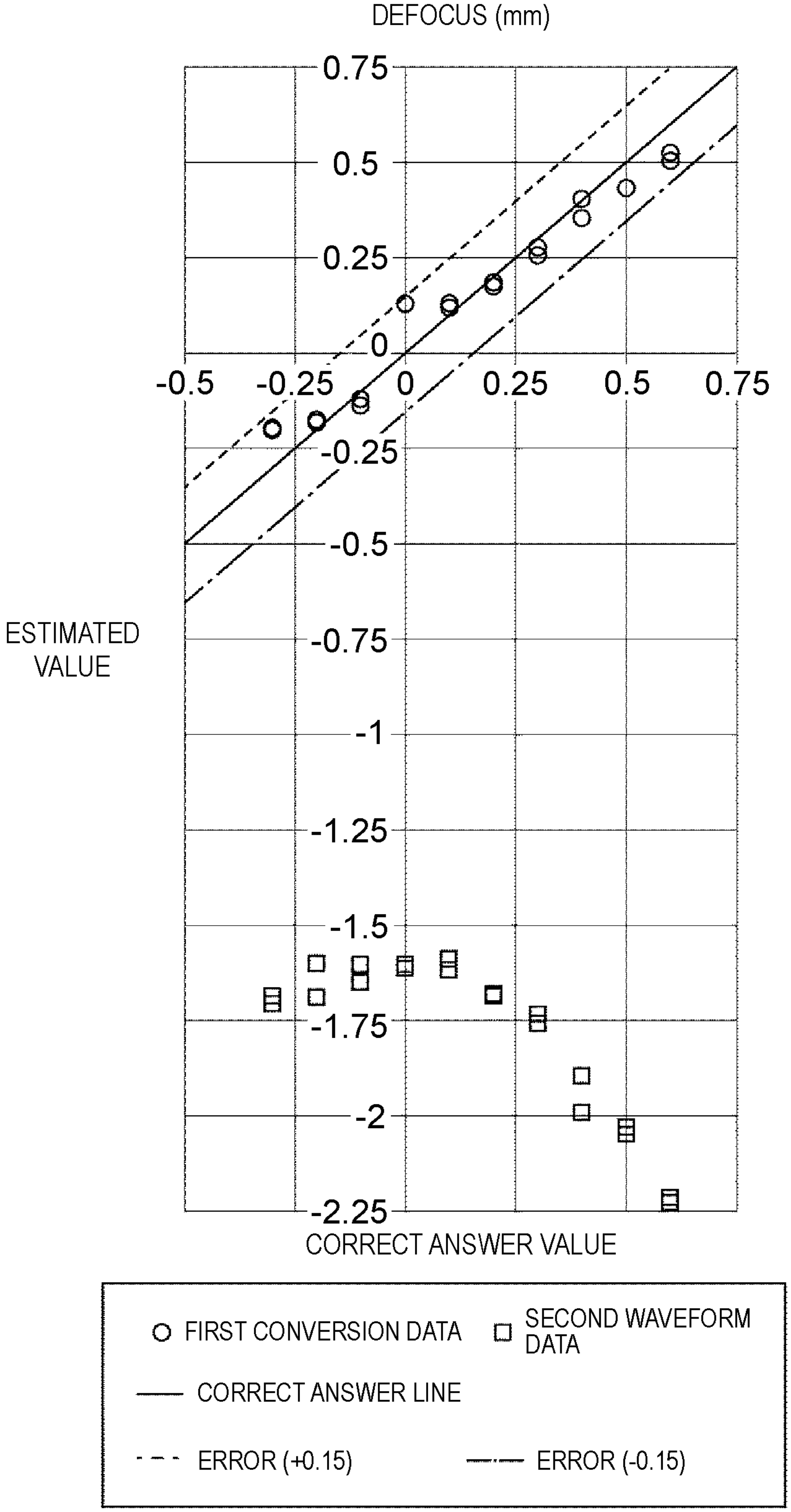
FIG. 4B is a graph showing a relationship between a correct answer value and an estimated value in a case where the first conversion data and the second waveform data are used as input data when the processing state estimation device estimates a processing state based on a first estimation model.

FIG. 4B is a graph showing a relationship between a correct answer value and an estimated value in a case where the first conversion data and the second waveform data are used as input data when processing state estimation device 200 estimates the processing state based on the first estimation model. As shown in the graph of FIG. 4B, the estimated value obtained by inputting the second waveform data as it is to estimating section 23 without converting the second waveform data by information converting section 22 is distributed approximately from −2.2 mm to −1.6 mm. This correct answer value is largely different from a correct answer value of −0.6 mm to 0.3 mm. On the other hand, the estimated value obtained by converting the second waveform data into the first conversion data by information converting section 22 and inputting the first conversion data to estimating section 23 has an error with the correct answer value within ±0.15 mm. In the present exemplary embodiment, since defocus of approximately 0.5 mm can be discriminated, it can be seen that a sufficiently practical estimation result is obtained.

Effects

According to the above-described exemplary embodiment, it is possible to provide the estimation model generation device and the processing state estimation device capable of using the estimation model generated by a predetermined processing device even in another processing device.

In the production line, it is difficult to use conditions other than the standard processing conditions used for normal production. In the above-described exemplary embodiment, sensing data good for various processing conditions is acquired by first device 300 different from the device used on the production line, and the estimation model is generated by using the first waveform data based on the sensing data. Thus, it is possible to generate the estimation model with higher estimation accuracy.

In addition, the first conversion data is generated from the second waveform data based on the sensing data in second device 400 used in the production line. Estimating section 23 of processing state estimation device 200 receives the first conversion data as the input, and thus, a more accurate estimation result can output by using the first estimation model for prediction of the processing state even in a case where there is a machine difference between the devices. That is, the first estimation model based on the sensing data of first device 300 can be used to estimate the processing state of other devices including second device 400.

Second Exemplary Embodiment

A second exemplary embodiment will be described with reference to FIGS. 5A and Note that, in the second exemplary embodiment, identical or equivalent configurations as those in the first exemplary embodiment are denoted by the same reference marks as those in the first exemplary embodiment. In addition, the description already given for the first exemplary embodiment is omitted for the second exemplary embodiment.

Figure 5A:
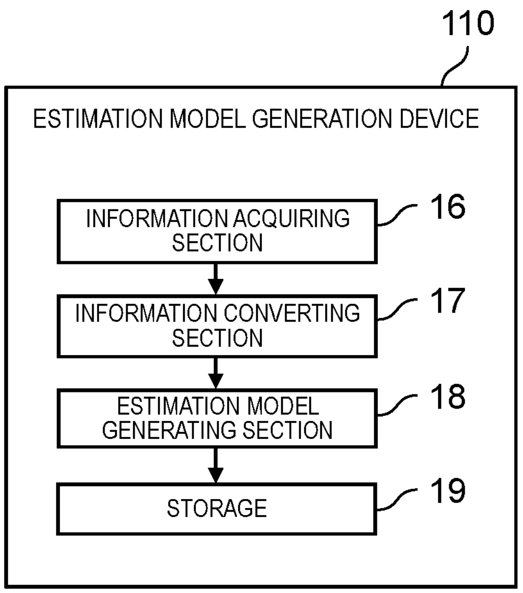
FIG. 5A is a block diagram illustrating an estimation model generation device according to a second exemplary embodiment.
Figure 5B:
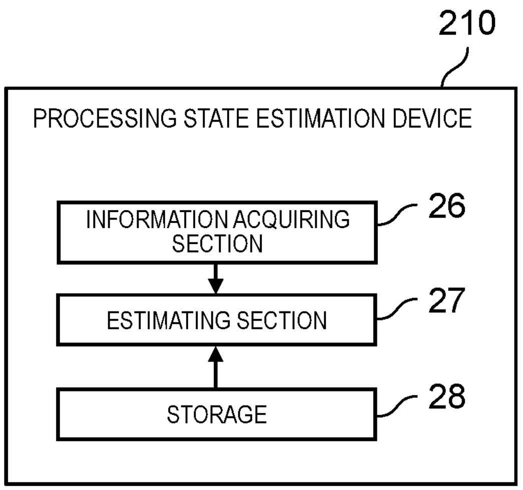
FIG. 5B is a block diagram illustrating a processing state estimation device according to the second exemplary embodiment.

FIG. 5A is a block diagram illustrating estimation model generation device 110 according to the second exemplary embodiment. FIG. 5B is a block diagram illustrating processing state estimation device 210 according to the second exemplary embodiment. The second exemplary embodiment is different from the first exemplary embodiment in that estimation model generation device 110 includes information converting section 17 and processing state estimation device 210 does not include the information converting section.

In the first exemplary embodiment, the first estimation model based on the sensing data of first device 300 generated by estimation model generation device 100 can also be used for estimating the processing state of second device 400. On the other hand, in the second exemplary embodiment, estimation model generation device 110 generates a second estimation model for estimating the processing state of first device 300 and a third estimation model for estimating the processing state of second device 400.

Estimation model generation device 110 includes information acquiring section 16, information converting section 17, estimation model generating section 18, and storage 19.

Information acquiring section 16 acquires third waveform data and fourth waveform data. The third waveform data includes a fifth waveform and a sixth waveform for at least two of third thermal radiation, third visible light, third reflected light, and third laser light observed during laser processing by first device 300 (see FIG. 1C). That is, the third waveform data corresponds to the first waveform data of the first exemplary embodiment. The fourth waveform data includes a seventh waveform and an eighth waveform for at least two of fourth thermal radiation, fourth visible light, fourth reflected light, and fourth laser light observed during laser processing by second device 400 (see FIG. 1D). That is, the fourth waveform data corresponds to the second waveform data of the first exemplary embodiment.

In the present exemplary embodiment, information converting section 17 of estimation model generation device 110 converts the third waveform data for first device 300 to match the fourth waveform data for second device 400 to generate the second conversion data.

For example, when the third laser light has the fifth waveform and the third visible light has the sixth waveform, the fourth laser light has the seventh waveform and the fourth visible light has the eighth waveform. In the present exemplary embodiment, information converting section 17 converts the third waveform data into the second conversion data by multiplying the fifth waveform by a third coefficient and multiplying the sixth waveform by a fourth coefficient. The third coefficient of the second exemplary embodiment is calculated from a relationship between the fifth waveform and the seventh waveform such that the first coefficient of the first exemplary embodiment is calculated from the relationship between the first waveform and the third waveform. Similarly, the fourth coefficient of the second exemplary embodiment is calculated from a relationship between the sixth waveform and the eighth waveform. The third coefficient and the fourth coefficient are determined such that the second conversion data is generated while a ratio between average values of the seventh waveform and the eighth waveform is maintained.

Estimation model generating section 18 generates the second estimation model by performing machine learning by using teacher data having the third waveform data as an explanatory variable and the processing state as a target variable. The second estimation model is an estimation model for estimating the processing state for first device 300. Further, estimation model generating section 18 generates the third estimation model by performing machine learning by using teacher data having the second conversion data as an explanatory variable and the processing state as a target variable. The third estimation model is an estimation model for estimating the processing state for second device 400.

Processing state estimation device 210 includes information acquiring section 26, estimating section 27, and storage 28. storage 28 stores the second estimation model and the third estimation model generated by estimation model generation device 110. Information acquiring section 26 acquires the third waveform data and the fourth waveform data. Estimating section 28 estimates the processing state of the workpiece in first device 300 from the third waveform data based on the second estimation model. Estimating section 28 further estimates the processing state of the workpiece in second device 400 from the fourth waveform data based on the third estimation model.

In the first exemplary embodiment, the example in which the processing state is estimated by using the first estimation model for first device 300 by converting the second waveform data for second device 400 during estimation by processing state estimation device 200 has been described. On the other hand, in the present exemplary embodiment, estimation model generation device 110 generates the second estimation model and the third estimation model for each of first device 300 and second device 400.

In the present exemplary embodiment, processing state estimation device 210 can estimate the processing state as an input to estimating section 27 without particularly converting the fourth waveform data based on the detection value in second device 400.

Effects

According to the above-described exemplary embodiment, since processing state estimation device 210 does not perform the processing of converting the waveform data, the time required for the estimation by estimating section 27 can be shortened.

INDUSTRIAL APPLICABILITY

The estimation model generation device and the processing state estimation device according to the present disclosure are widely applicable to the prediction of the processing state in the processing device that performs the laser processing.

REFERENCE MARKS IN THE DRAWINGS

100, 110 estimation model generation device
11, 16 information acquiring section
17 information converting section
12, 18 estimation model generating section
13, 19 storage
16 information acquiring section
200, 210 processing state estimation device
21, 26 information acquiring section
22 information converting section
23, 27 estimating section
24, 28 storage

The invention claimed is:

1. A processing state estimation device that estimates a processing state of laser processing in a second device different from a first device based on a first estimation model, wherein first thermal radiation, first visible light, first reflected light, and first laser light are observed from a workpiece during laser processing by the first device, and second thermal radiation, second visible light, second reflected light, and second laser light are observed from a workpiece during laser processing by the second device, and wherein the first estimation model for estimating the processing state by the first device uses a first waveform data including a first waveform and a second waveform for at least two of first thermal radiation, first visible light, first reflected light, and first laser light as machine learning by using teacher data having the first waveform data as an explanatory variable and the processing state as a target variable in association with each other is generated, the processing state estimation device comprising:

a storage that stores the first estimation model; and a processor configured to perform:

acquiring second waveform data including a third waveform and a fourth waveform for at least two of second thermal radiation, second visible light, second reflected light, and second laser light being observed from a workpiece during laser processing by the second device;

generating first conversion data by multiplying the third waveform by a first coefficient calculated by a relationship between the third waveform and the first waveform and multiplying the fourth waveform by a second coefficient calculated by a relationship between the fourth waveform and the second waveform; and estimating the processing state from the first conversion data based on the first estimation model.

2. The processing state estimation device according to claim 1, wherein the first coefficient and the second coefficient are determined in such a manner that the first conversion data is generated while a ratio between average values of the first waveform and the second waveform is maintained.

3. An estimation model generation device that generates an estimation model for estimating a processing state of laser processing in a first device and a second device, the estimation model generation device comprising:

a processor configured to perform:

acquiring third waveform data including a fifth waveform and a sixth waveform for at least two of third thermal radiation, third visible light, third reflected light, and third laser light being observed from a workpiece during laser processing by the first device, and fourth waveform data including a seventh waveform and an eighth waveform for at least two of fourth thermal radiation, fourth visible light, fourth reflected light, and fourth laser light being observed from the workpiece during laser processing by the second device;

generating second conversion data by multiplying the fifth waveform by a third coefficient calculated by a relationship between the fifth waveform and the seventh waveform and multiplying the sixth waveform by a fourth coefficient calculated by a relationship between the sixth waveform and the eighth waveform;

generating a second estimation model for estimating the processing state by the first device and a third estimation model for estimating the processing state by the second device; and a storage that stores the second estimation model and the third estimation model, wherein the estimation model generation device generates the second estimation model by performing machine learning by using teacher data having the third waveform data as an explanatory variable and the processing state as a target variable in association with each other, and generates the third estimation model by performing machine learning by using teacher data having the second conversion data as an explanatory variable and the processing state as a target variable in association with each other.

4. The estimation model generation device according to claim 3, wherein the third coefficient and the fourth coefficient are determined in such a manner that the second conversion data is generated while a ratio between average values of the seventh waveform and the eighth waveform is maintained.

5. A processing state estimation device that estimates a processing state of laser processing, the processing state estimation device comprising:

a storage that stores a third estimation model generated by the estimation model generation device according to claim 4; and the processor is further configured to perform:

acquiring the fourth waveform data; and estimating the processing state from the fourth waveform data based on the third estimation model.

* * * * *